G. HARLING.
CHUCK.
APPLICATION FILED APR. 9, 1918.

1,269,434.

Patented June 11, 1918.

INVENTOR
GUSTAF HARLING
BY Howson and Howson
ATTORNEYS

UNITED STATES PATENT OFFICE.

GUSTAF HARLING, OF STOCKHOLM, SWEDEN.

CHUCK.

1,269,434.   Specification of Letters Patent.   Patented June 11, 1918.

Application filed April 9, 1918. Serial No. 227,515.

*To all whom it may concern:*

Be it known that I, GUSTAF HARLING, a subject of the King of Sweden, and resident of Krukmakaregatan Nr. 12, Stockholm, Sweden, have invented certain new and useful Improvements in Chucks, of which the following is a specification.

The present invention relates to chucks and particularly to drill-chucks, and the object of my invention is to provide an improved gripping device for holding the drill shank.

In the accompanying drawing.

Figure 1:
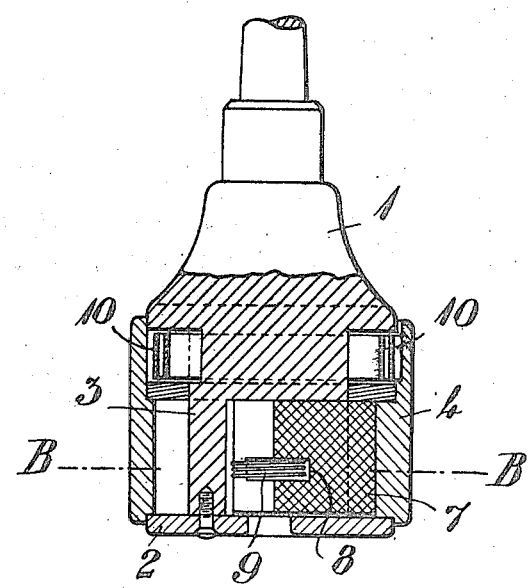
Figure 1 is a side elevation, partly in section, on the line A—A, Fig. 2, showing a chuck in which my invention is embodied in one form.
Figure 2:
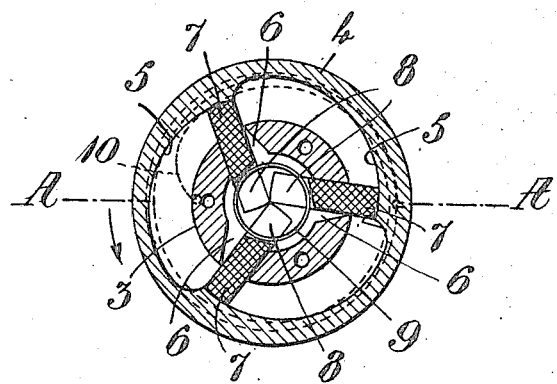
Fig. 2 is a section on the line B—B, Fig. 1.

The drill-chuck here shown is of the type in which the drill shank is held by a number of clamping jaws which slide approximately radially in the chuck against the pressure of a spring, said jaws being forced against the drill shank by means of cam surfaces on the inner face of a spring-pressed, rotatable sleeve. The chuck body 1 has an integral hub 3 to the outer end of which is secured a ring-plate 2, serving to retain the rotatable sleeve 4 in position surrounding the hub. On the inner face of the sleeve 4 are three eccentrically curved surfaces 5, the generatrixes of which are parallel to the axis of rotation of the chuck. The hub 3 has a central bore, into which the drill shank is inserted, and its wall is pierced by three symmetrically disposed longitudinal slots 6 with beveled sides. Passing through the slots are three wedge blocks 7, which, by reason of the bevel of the slots 6, have limited freedom of angular play therein. The inner faces of the wedge blocks project into the bore of the hub and grip the drill shank. The outer surfaces of the wedge blocks bear against the corresponding cam surfaces 5 of the sleeve 4. The outer and inner surfaces of the wedge blocks are parallel. Channels 8 are cut in the inner surfaces of the wedge blocks and lie in the same plane at right angles to the bore of the hub. The bottoms of these channels are preferably inclined, as shown, to the planes of the bearing surfaces, and a spiral expansion spring 9, within the bore of the hub, engages the bottoms of these channels. The spring 9 constantly presses the several wedge blocks not only outward against the cam surfaces 5 of the sleeve 4, but also against one side of the several slots 6, in which the wedge blocks work. The chuck body and sleeve have attached to them, in known manner, a spring 10, which tends constantly to rotate the sleeve in the direction of the arrow, Fig. 2.

To remove a drill from the chuck, the sleeve 4 may be merely grasped by the hand, if the drill is in operation; or, if the drill is not in operation, then the sleeve is rotated against the action of the spring 10. This action removes the pressure of the cams 5 from the outer surfaces of the wedge blocks 7, and the spring 9 then presses the blocks outward, thus releasing the drill shank. To insert a new drill, it is merely necessary to insert the shank while the sleeve 4 is thus rotated and the wedge blocks expanded, and then release the sleeve, whereupon the spring 10 automatically rotates the sleeve in a direction to force the cam faces 5 against the outer ends of the wedge blocks and thus press the latter inward to grip the drill shank.

I claim as my invention:

1. A chuck comprising a hub centrally bored to receive a tool shank and pierced by a series of circumferentially spaced longitudinal slots, a corresponding series of wedge blocks of rectangular cross section, said blocks being channeled in the same plane on their inner gripping surfaces, the bottoms of the channels being inclined to the plane of the outer and inner surfaces of said blocks, an expansion coil spring common to said wedge blocks and confined within the bore of the hub and lying in the channels of said wedge blocks, in combination with a rotatable sleeve surrounding the hub and having on its inner face wedging surfaces engaging the outer surfaces of the wedge blocks to force the latter inward against the action of said expansion spring.

2. A chuck comprising a hub centrally bored to receive a tool shank and pierced by a series of circumferentially spaced, longitudinal slots, the sides of each slot being oppositely inclined to afford a beveled slot of greater inner than outer diameter, a corresponding series of wedge blocks passing through said slots into the hub bore and having limited freedom of angular play in said slots, said blocks being channeled in the same plane on their inner gripping surfaces, an expansion coil spring common to said wedge blocks and confined within the bore of the hub and lying in the channels of said wedge blocks, in combination with a rotatable sleeve surrounding the hub and having on its inner face wedging surfaces engaging the outer surfaces of the wedge blocks to force the latter inward against the action of said expansion spring.

In testimony whereof I have signed my name to this specification, in the presence of two subscribing witnesses.

GUSTAF HARLING.

Witnesses:
    JACOB BAGGE,
    FILIP ÅSTRÖM.